3,067,255
PRODUCTION OF ETHYLENE DIAMINE

Heinrich Scholz, Ludwigshafen (Rhine), and Paul Guenthert, Iggelheim, Pfalz, Germany, assignors to Badische Anilin- & Soda-Fabrik Aktiengesellschaft, Ludwigshafen (Rhine), Rheinland-Pfalz, Germany
No Drawing. Filed July 21, 1958, Ser. No. 749,618
Claims priority, application Germany Dec. 24, 1955
1 Claim. (Cl. 260—585)

This invention relates to an improved process for the production of ethylene diamine.

It is known to produce ethylene diamine by reacting formaldehyde with hydrocyanic acid, heating the resultant hydroxyacetonitrile (=formaldehyde cyanhydrin) with aqueous or alcoholic ammonia solutions or with liquid ammonia, separating the aminoacetonitrile formed and then hydrogenating it catalytically (cf. U.S. patent specifications Nos. 2,429,876 and 2,519,803).

This method has the disadvantage that the intermediate product, i.e. aminoacetonitrile, is unstable and decomposes rapidly giving dark-colored polymerization and condensation products from which no ethylene diamine is obtained by hydrogenation.

We have now found that the shortcoming inherent in the aforesaid prior art method can be overcome and ethylene diamine can be produced in a considerably simpler way and also in continuous operation with consistently high yields by leading hydroxyacetonitrile or the technical-grade product obtainable from aqueous formaldehyde and hydrocyanic acid over a hydrogenation catalyst together with ammonia and excess hydrogen at increased pressure and elevated temperature.

Hydrogenation catalysts especially useful in the practice of our invention are metallic cobalt and nickel. The metals can be easily obtained from the oxides, hydroxides and carbonates of cobalt and nickel, as also from organic salts thereof, as for example the formates, by reduction in conventional manner. The catalysts can be further activated by adding to them a metal of the sixth or seventh group of the periodic system, mixtures of these metals or a compound of any such metal, for example of an oxide, such as chromium oxide or manganese oxide, in small amounts, e.g. from about 1 to 10 percent by weight, percentage with reference to the metallic cobalt or nickel. The catalytically active metallic cobalt or nickel also when activated by an activator of the defined art, can also be mixed with 10 to 30 percent by weight of a carrier substance, with reference to the metallic cobalt or metallic nickel and then be pressed into pills or pellets, or be applied to such carriers. Examples of substances suitable for use as carriers for the catalysts are alumina, magnesium oxide, silicates, silica gels, fuller's earth or activated carbon or mixtures of the said substances. The quantity of the catalyst in practical use, i.e. in the reaction of hydroxyacetonitrile with ammonia and hydrogen, is determined by its activity. In the usual case good yields of ethylene diamine will be obtained if the quantity of hydroxyacetonitrile passed over the catalyst in admixture with ammonia and hydrogen is up to 1 liter, advantageously from 0.05 to 0.3 liter per hour to each liter of catalyst. The catalyst can be used either in fixed bed or a fluid bed arrangement.

In the practice of our invention technical grade hydroxyacetonitrile, such as is obtained, for example, by the reaction of from 30 to 36 percent aqueous formaldehyde with hydrocyanic acid or aqueous solutions of hydrocyanic acids, can be advantageously used as charging stock without previous purification. In the usual case, the said solutions contain from about 30 to 51 percent of hydroxyacetonitrile. The hydroxyacetonitrile can also be used in a highly concentrated form, for example in a concentration of from 60 to 80 percent by weight or even more, say 90 percent by weight, or also in an anhydrous form, by dehydrating the solutions wholly or partly by evaporation.

The hydrogenation is carried out at raised temperature, for example a temperature of between about 40° and 200° C., and at increased pressure, for example from 50 to 700 atmospheres. The optimum temperature and pressure vary depending on the composition of the catalyst and the speed of throughput. A high speed of throughput generally requires an elevated temperature when low pressures are used and increased pressure when the temperature is to be maintained relatively low. Generally, the most favorable temperatures lie between 50° and 150° C., while the most favorable pressures vary between 75 and 400 atmospheres.

The ammonia and hydrogen components of the hydrogenation are used at a rate of about 20 to 100, advantageously about 20 to 50 moles of liquid ammonia, and about 100 to 1,400, advantageously 800 to 1,200 liters (N.T.P.) of hydrogen to one mole of hydroxyacetonitrile.

It is advantageous to heat the reactants prior to carrying them to hydrogenation. They may be heated either by themselves or in admixture with each other. A variant of the process according to our invention provides mixing the hydroxyacetonitrile with liquid ammonia, heating the mixture to 50° to 115° C., feeding it into the hydrogenation vessel and then pressing in the hydrogen, either preheated or not. If preheated, the temperature of the hydrogen, if desired, may be about 10° to 50° C. above the hydrogenation temperature. It has been found advantageous to heat at least part of the hydrogen to a temperature exceeding the working temperature. Still another variant of the process consists in pressing the hydrogen on to the preheated hydroxyacetonitrile-ammonia mixture in a separate vessel and thence feeding the mixture into the catalyst charged hydrogenation vessel from one point or from several points at a time.

In order to prevent a drop of the reaction temperature, the reactor may be heated externally and/or the hydrogen which is conducted in a cycle, or a part of the same may be heated to a temperature higher than the reaction temperature and supplied to the reactor at one or more places. The products leaving the reactor give up their heat in a heat exchanger to one or more of the reactants.

The liquid reaction mixture can be allowed to trickle down over the catalyst rigidly arranged in a vertical vessel, the hydrogen being supplied in cocurrent or countercurrent. The liquid mixture of the reactants, however, may be introduced together with the hydrogen into the bottom of the said vessel so that the vessel is always filled with liquid reaction mixture and the reaction products are withdrawn at the top of the vessel.

The reaction mixture leaving the reaction chamber yields by fractional distillation, first excess ammonia and unreacted hydrogen which can be mixed again with the circulating material, and then a high yield of pure ethylene diamine. Diethylene triamine and triethylene tetramine, as well as polyamines of higher molecular weight, are obtained as byproducts.

The advantage of the new process as compared with the known processes consists in the fact that the preparation, isolation and purification of the unstable aminoacetonitrile is avoided. This represents a simplification of the apparatus; above all, however, the process gives consistently good yields.

Ethylene diamine is known to be a valuable intermediate product, especially for textile assistants and complex-forming compounds.

The essence of our invention and how the same is to be carried out in practice will be described in some detail in the following examples, but the examples are not intended to restrict the invention to the particular embodiments illustrated.

*Example 1*

Through a heatable tube, 1.6 m. in length and 4.35 cm. in inside width, which is charged with 1,800 cc. of a pilled catalyst of reduced cobalt oxide, there is hourly passed a mixture of 240 grams of technical-grade hydroxyacetonitrile containing 50% of water and 2,000 cc. of liquid ammonia together with 1,260 liters (N.T.P.) of hydrogen per hour at a temperature of 100° C. and a pressure of 315 atmospheres. The reaction product is collected in a catch-pot and then decompressed into a container, the bulk of excess ammonia and hydrogen being discharged. The liquid fraction which still contains ammonia is then subjected to fractional distillation under normal pressure, 111.0 grams of ethylene diamine being obtained as a main fraction from the crude product hourly produced. This is 88% of the theoretical quantity. Follows a polyamine mixture (8 g.) which mainly consists of diethylene triamine and triethylenetetramine. The overall yield of amines amounts to 94% of the theory.

*Example 2*

A reactor of the type described in Example 1 is charged with a pilled catalyst consisting of cobalt oxide and alumina in a weight ratio of 4:1. After reducing the catalyst with hydrogen, 240 grams of technical-grade hydroxyacetonitrile containing 50 percent of water, 2,900 cc. of liquid ammonia and 630 liters (N.T.P.) of hydrogen are passed through the reactor per hour in a downward direction at a temperature of 110° C. and a pressure of 250 atmospheres. The reaction product is collected in a catch-pot, then decompressed and further processed by distillation as in Example 1. There are obtained 106 grams of ethylenediamine, corresponding to a yield of 84% of the theory, and 12 grams of a polyamine mixture which mainly consists of diethylenetriamine and triethylenetetramine. The overall yield amounts to 93% of the theory.

*Example 3*

A tubular reactor 1.4 m. in length and 4.35 cm. in inside width, provided with an external heating device, is charged with a pilled catalyst of reduced cobalt oxide activated with 2% of chromium oxide. Through the reactor there are hourly passed 134 grams of technical-grade hydroxyacetonitrile containing 10% of water along with 1,200 cc. of ammonia and 1,580 liters (N.T.P.) of hydrogen in a downward direction, at a temperature of 95° C. and a pressure of 350 atmospheres. The reaction mixture is collected in a catchpot and decompressed into a container, the bulk of excess ammonia and the hydrogen being discharged by evaporation. The remaining crude mixture which still contains some ammonia, is subjected to fractional distillation under normal pressure. As a main product ethylene diamine is obtained in an amount of 113 grams, followed by a polyamine mixture in an amount of 7 grams. The yield of ethylene diamine amounts to 90% of the theory; the overall yield of amines amounts to 95% of the theory.

*Example 4*

Through a reactor of the type described in Example 1, which is charged with a pilled catalyst of reduced cobalt oxide, there are passed per hour 365 grams of technical-grade hydroxyacetonitrile containing 67% of water, together with 2,350 cc. of liquid ammonia and 1,050 liters (N.T.P.) of hydrogen in a downward direction, at a temperature of 105° C. and a pressure of 150 atmospheres. The reaction product is collected in a catch-pot and thence decompressed into a container, the excess ammonia and hydrogen being discharged. The liquid fraction which remains is subjected to fractional distillation, 107 grams of ethylene diamine (=85% of the theoretical amount) and 11 grams of polyamine, mainly diethylene triamine and triethylenetetramine, being obtained. The overall yield of amines amounts to 93% of the theory.

*Example 5*

A tubular reactor 1.6 m. in length and 4.35 cm. in inside width, provided with an external heating device, is charged with a pilled catalyst of reduced nickel oxide. Through the reactor there are hourly passed 250 grams of technical-grade hydroxyacetonitrile containing 52% of water together with 2,000 cc. of liquid ammonia and 1,680 liters (N.T.P.) of hydrogen at a temperature of 105° C. and a pressure of 315 atmospheres. The reaction product is collected in a catch-pot, decompressed into a container and subjected to fractional distillation at normal pressure. There are obtained 104 grams of ethylene diamine, i.e. 82% of the theoretical amount, passing over at a temperature of 116° to 118° C., and 11 grams of a polyamine mixture which passes over at a temperature of 180° to 300° C. The overall yield of amines amounts to 91% of the theory.

*Example 6*

420 grams of technical-grade hydroxyacetonitrile containing 55% of water and 2,500 cc. of liquid ammonia are passed per hour first through a heated mixer at a pressure of 300 atmospheres and then, at a temperature of 90° C., through a reactor, charged with a pilled catalyst of reduced cobalt oxide, at 110° C. in a downward direction, while hydrogen under a pressure of 300 atmospheres is pressed in at a rate of 2,300 liters (N.T.P.). The reaction product is collected in a catch-pot and then decompressed into a container, the bulk of excess ammonia and hydrogen being discharged. The liquid fraction which still contains ammonia is subjected to fractional distillation at normal pressure. There are obtained 170 grams of ethylene diamine as a main product at 116 to 118° C., i.e. 85% of the theoretical amount. On further distilling, 13 grams of a polyamine mixture, mainly diethylene triamine and triethylenetetramine, are obtained. The overall yield of amines amounts to 91.4% of the theory.

*Example 7*

26.7 kilograms of technical-grade hydroxyacetonitrile containing 55% of water and 0.269 m.$^3$ of liquid ammonia are passed through a heated mixer per hour at a pressure of 310 atmospheres and thence, having been heated to 90° C., into the bottom part of an upright reaction tower 6.1 m. in length and 20 cm. inside width, which is charged with a pilled catalyst of reduced cobalt oxide, in continuous flow, together with hydrogen pressed in under a presesure of 310 atmospheres at a rate of 210 m.$^3$ (N.T.P.). The inside temperature of the reaction tower is maintained at 115° C. The reaction products, which leave at the top end of the reaction tower, are passed through the aforesaid mixer, this being constructed to function as a heat-exchanger, and then through a cooler in which they are cooled down to 16° C., into a stripper from which the excess hydrogen is withdrawn and recycled into the reaction. The liquid reaction product is decompressed to 15 atmospheres into a pressure column and heated therein to 197° C. with the bulk of the ammonia distilling off. The warm ammonia is liquefied in a condenser and fed into a pressure vessel to be re-mixed with further quantities of hydroxyacetonitrile. The crude ethylene diamine which still contains some ammonia is subjected to fractional distillation at normal pressure. There are obtained from the quantity of crude ethylene diamine hourly produced 11.23 kilograms of pure ethylene diamine, i.e. 89% of the theoretical yield, and 0.76 kilogram of a polyamine mixture which mainly consists of diethylene triamine and triethylenetetramine. The overall yield of amines amounts to 94.5% of the theory.

Example 8

23.5 kilograms of technical-grade hydroxyacetonitrile containing 49% of water and 0.231 m.$^3$ of liquid ammonia are passed through a heated mixer per hour at a pressure of 280 atmospheres and thence, at a temperature of 90° C., into the top end of an upright reaction tower 6.1 m. in height and 20 cm. in inside width, together with 206 m.$^3$ (N.T.P.) of hydrogen fed in under a pressure of 280 atmospheres the reactants flowing down over a catalyst packing which consists of a mixture of 60% of reduced cobalt oxide and 40% of magnesium silicate. The inside temperature of the reaction tower is maintained at 120° C. The reaction products which continuously emerge from the reactor at its bottom end are processed as described in Example 7. By fractional distillation at normal pressure there are obtained 10.48 kilograms of pure ethylene diamine, i.e. 83% of the theoretical yield, and 1.23 kilograms of a polyamine mixture from the quantity of crude ethylene diamine hourly obtained. The overall yield of amines amounts to 92.8% of the theory.

Example 9

13.3 kilograms of technical-grade hydroxyacetonitrile containing 10% of water and 0.434 m.$^3$ of liquid ammonia are passed through a preheater per hour at a pressure of 400 atmospheres and thence, at a temperature of 90° C., into a reaction tower of the type described in Example 8 together with 190 m.$^3$ (N.T.P.) of hydrogen fed in under a pressure of 400 atmospheres. The reactor is charged with a pilled catalyst of reduced cobalt oxide which has been activated with 2% of manganese oxide. The hydrogenation is carried out at 100° C. The reaction products are processed as described in Example 8. By fractional distillation at normal pressure there are obtained 11.24 kilograms of pure ethylene diamine, i.e. 89% of the theoretical yield, and 0.82 kilogram of a polyamine mixture from the quantity of crude ethylene diamine obtained hourly. The overall yield of amines amounts to 95% of the theory.

Example 10

28.6 kilograms per hour of technical-grade hydroxyacetonitrile containing about 58% of water are heated together with 0.2 m.$^3$ of liquid ammonia in a mixing aggregate to about 90° C. The heated reaction mixture is then hydrogenated with 50 cm.$^3$ (N.T.P.) of hydrogen at 90° to 110° C. under a total pressure of 200 atmospheres in the presence of a reduced catalyst consisting of 80% of cobalt oxide and 20% of silica gel. The yields of pure ethylene diamine and polyamines are the same as in Example 1.

This application is a continuation-in-part of our application Serial No. 626,813, filed December 7, 1956 (now abandoned).

What we claim is:

A continuous process for producing ethylene diamine which consists essentially of: passing hydroxyacetonitrile over a hydrogenation catalyst selected from the group consisting of cobalt and nickel metal together with molar excesses of ammonia and hydrogen at a pressure of at least about 50 atmospheres and at a temperature of from about 50° C. to about 150° C., and thereafter separating the formed ethylene diamine from the reaction mixture.

References Cited in the file of this patent

UNITED STATES PATENTS

| | | |
|---|---|---|
| 2,365,721 | Olin et al. | Dec. 26, 1944 |
| 2,429,876 | Gresham | Oct. 28, 1947 |
| 2,519,803 | Weber et al. | Aug. 22, 1950 |
| 2,640,082 | Schreyer | May 26, 1953 |
| 2,848,495 | Villemey | Aug. 19, 1958 |

FOREIGN PATENTS

| | | |
|---|---|---|
| 1,005,073 | Germany | Mar. 28, 1957 |
| 798,075 | Great Britain | July 16, 1958 |